US005370029A

United States Patent [19]

Kramer

[11] Patent Number: 5,370,029

[45] Date of Patent: Dec. 6, 1994

[54] ELECTROMAGNETICALLY OPERATED VALVE

[76] Inventor: Justin Kramer, 3972 Humboldt Dr., Huntington Beach, Calif. 92649

[21] Appl. No.: 68,792

[22] Filed: Jun. 1, 1993

[51] Int. Cl.5 .......................... G10B 3/10; H01F 7/00; F16K 31/44

[52] U.S. Cl. ...................................... 84/339; 335/229; 335/276; 251/65; 251/129.2

[58] Field of Search ................. 84/334, 335, 337, 338, 84/339, 341, 342, 343; 335/233, 275, 276, 277, 229, 271; 251/65, 129.2

[56] References Cited

U.S. PATENT DOCUMENTS

| | | | |
|---|---|---|---|
| 2,083,644 | 6/1937 | Floro et al. | 84/339 |
| 4,677,892 | 7/1987 | Kramer et al. | 84/405 |
| 4,851,800 | 7/1989 | Peterson et al. | 355/229 |

*Primary Examiner*—Howard B. Blankenship

*Assistant Examiner*—Cassandra C. Spyrou

*Attorney, Agent, or Firm*—James G. O'Neill

[57] ABSTRACT

An electromagnetically operated valve assembly having a valve closure means attached to a vertically suspended armature supported at its top portion, is held in magnetic fields at both the top and bottom portions of the armature, caused by permanent magnets reacting to iron or other permanent magnets. The movement of the armature is guided to insure close alignment and to eliminate side play by means of a main frame assembly mounted in a pipe organ wind chest so as to control air under pressure from the wind chest into at least one pipe organ. The permanent magnet at the bottom portion of the armature cooperates with an iron core of a solenoid mounted to the main frame assembly, to close or open the valve. The valve may also be provided with a second solenoid to both assist moving the valve to the open position, and to aid in holding the valve in the open position.

20 Claims, 4 Drawing Sheets

ELECTROMAGNETICALLY OPERATED VALVE

BACKGROUND OF THE INVENTION

1. Field of the Invention

This invention generally relates to pipe organs and, more particularly, to the efficient operation of valves which control the flow of air into pipes to produce musical sounds.

2. Description of Related Art

Although the pipe organ has a long history, spanning many centuries, as a musical instrument, it was not until the first half of the nineteenth century that organ builders provided organists with devices to assist in opening the valves to the pipes of such organs. Before that time, the organist had to manually operate the valves through a complex system of mechanical levers attached to the organ keyboard. These complex systems required the organist to supply all of the energy needed to manually operate the valves. In large systems having large valves, this required substantial energy and frustrated many organists.

However, in the twentieth century organ builders have made wide use of valves attached to lever magnets, as well as valves attached to pneumatic bellows or diaphragms, which in turn are activated by a magnetically controlled valve. In both instances this reduced the effort needed on the part of the organist, since the operation of the valve merely required the electrical closure of contacts attached to an organ keyboard.

Even though thousands of organs have been built using one form or another of these electrically operated valves, many organists and organ builders have found the performance of such organs substantially lacking. In particular, during the second half of the twentieth century, many organ builders have abandoned the use of electrically and/or magnetically operated valves and have returned to the building of organs using direct mechanical action to manually operate organ valves, much as their predecessors were doing centuries ago.

In order to understand this interesting phenomena, an understanding of how pipe organs produce sound is necessary. Sound is produced in organ pipes in a manner analogous to the way sound is produced in the woodwind instruments of an orchestra, such as flutes, clarinets, etc. This sound can in general be referred to as being in one of three states: (1) the "on" speech, sometimes referred to as the "attack"; (2) the sustain or continuous state; and (3) the "off" speech, sometimes referred to as the "decay". Every pipe organ produces these three states of sound. The attack and the decay speech, in particular, are of great importance. The attack is determined by how air under pressure is admitted to the pipe by the controlling valve, while the decay is determined by how flow of air under pressure to the pipe is interrupted by the controlling valve. It is the accurate and controlled opening and closing of electric or magnetic valves that has produced many problems for the organ builder and the organist.

Among those problems realized by the organ builder are those relating to efficiency. This occurs since even a modest size pipe organ will have in excess of a thousand pipes, thereby requiring an equal number of control valves. In such circumstances it is sometimes necessary to operate hundreds of valves simultaneously. This requirement brings on further problems, such as voltage drops in high current circuits, having large bundles or groups of wires, which large bundles of wires produce their own problems.

Another problem that frequently arises occurs in the hinges of valves attached to lever magnets. This is because ordinarily pipe organs may be considered to be "intermittent" devices, and during periods of inactivity, the hinges of the lever magnet valves may become corroded or somehow impaired. This impairment affects the operation of the valves, and this, in turn, causes their behavior to be inconsistent and erratic, especially during opening and closing of the valves. Additionally, lever magnets tend to be heavy because of the use of iron in the levers and other components. These heavy components require more energy to initially move the valve.

Lever magnets also ordinarily suffer from a lack of dampening in the closing of the valve, thus causing the valve to "bounce". This bounce, in turn provides an extra burst of air to the pipe, which is highly undesirable.

Known valves also suffer alignment and guide problems, resulting from, among other things, improper installation, which in turn results in improper seating of the valve to cut-off and/or control flow of air therethrough.

Therefore, in known electromagnetically operated valves for use in pipe organs, the organ builder and organist have been at the mercy of the above-mentioned eccentricities of the operation of the valves. That is, there has been practically no control over the closing and opening of such known valves, or the proper alignment thereof.

Besides the problems, or detrimental factors mentioned above, there is the fact that in known electromagnetically operated valves, the travel of the valve was extremely limited. Because of this limited travel, the valves operated by such devices were seldom, if ever, fully opened. Furthermore, in an effort to reduce the mass of the valves to conserve energy, construction of the component parts of the valves tended to be flimsy, subjecting the valves to being easily broken and undue wear, thereby requiring frequent repairs and/or replacements.

An example of a known electromagnetically operated valve for pipe organs, which overcame some of the problems discussed above, is disclosed in U.S. Pat. No. 4,851,800, in the name of Richard H. Peterson and Justin Kramer. However this patent did not overcome all of the problems mentioned above, and includes a return spring to aid the valve closure to return to the closed position.

A further example of a somewhat analogous electromagnetically operated device for percussion instruments, but which is not fully applicable to pipe organ valves and suffers from some of the problems mentioned above, is disclosed in U.S. Pat. No. 4,667,892, in the name of Justin Kramer and Richard H. Peterson.

There, therefore, exists a long-felt need in the art for a simplified, electromagnetically operated valve which meets the requirements of organ builders and organists alike.. The valve set forth herein meets these requirements, and more, in an elegant and reliable manner to provide a valve which is easy and relatively inexpensive to manufacture, and which operates in a consistent and desired manner.

SUMMARY OF THE INVENTION

It is, therefore, a general object of the present invention to provide a new and improved valve for pipe organs.

It is a more particular object of the present invention to provide an electrically operated valve for pipe organs.

It is yet another object of the present invention to provide an electrically operated valve for pipe organs wherein the closing motion of the valve is highly damped to eliminate "bounce".

It is yet a further object of the present invention to provide a more efficient electrically operated valve for pipe organs requiring no return spring.

It is a still further object of the present invention to provide an electrically operated valve for pipe organs having a single, very solid main frame which is easy to manufacture and install and which is capable of accommodating a large variety of valve sizes and shapes.

It is a further particular object of the present invention to provide an electrically operated valve for pipe organs having an improved hinge which eliminates the corrosion and other problems of existing valves.

It is still a further particular object of the present invention to provide an electrically operated valve for pipe organs having an improved magnetic hinge, with substantially no resistance.

It is yet a still further object of the present invention to provide an electrically operated valve for pipe organs having an adjustment means for controlling the closing speed of the valve and means to properly align and guide the movement thereof.

It is yet a further particular object of the present invention to provide an electrically operated valve for pipe organs having adjustment means for controlling the effective speed of the opening and closing of the valve.

In accordance with one embodiment of the present invention there is provided an electrically operated valve assembly wherein the valve closure means is secured to a vertically suspended armature, with the armature being supported at the top portion by a small guide pin, and being held in magnetic fields at both the top and bottom portions thereof. The magnetic holding fields are produced by permanent magnets reacting to iron or other permanent magnets. A main frame assembly supports the armature and is adapted to be mounted in a conventional pipe organ wind chest in a manner so that the valve controls air under pressure from the main wind chest to a pipe organ. The armature also includes a permanent magnet at the bottom portion thereof for cooperation with a solenoid having an iron core mounted to the main frame assembly, adjacent the permanent magnet. The activation and deactivation of the solenoid serves to open the armature and valve closure member, or hold the armature and valve closure member in the closed position.

In a further embodiment of the invention, a second solenoid is employed to operate in such a manner that it will attract an iron plate mounted on the armature to hold the armature against this second solenoid in the open position, or to aid the armature to move the valve closure member to the closed position.

In yet another embodiment of the invention, a second solenoid is located opposite to the armature to operate in cooperation with a still further permanent magnet mounted to the armature.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for an improved electromagnetically operated valve, generally indicated as 110, to control the flow of air to an organ pipe, generally indicated as 111.

Figure 1:
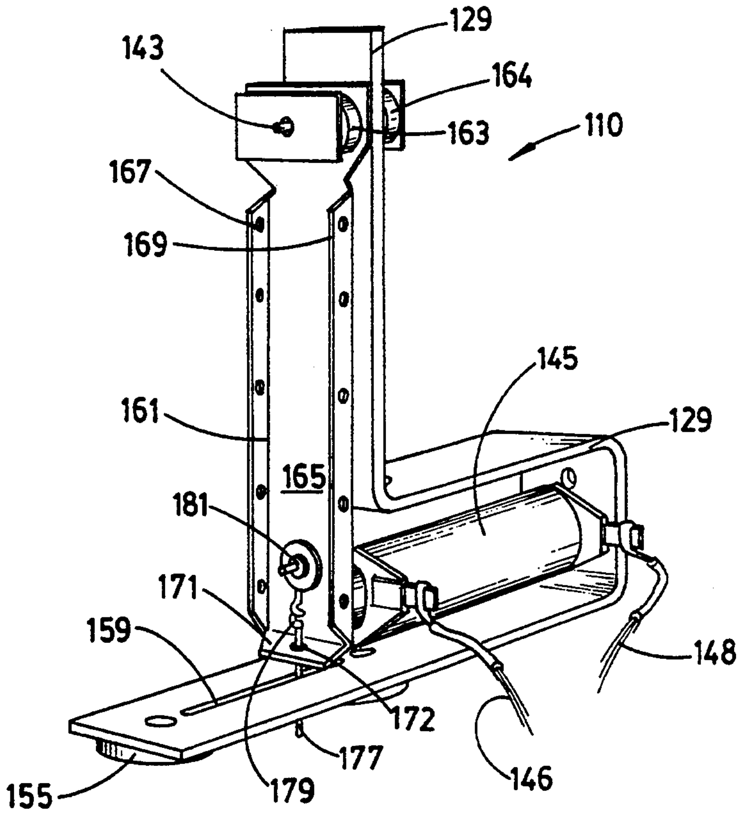
FIG. 1 is a perspective view of one embodiment of the valve of the present invention.
Figure 2:
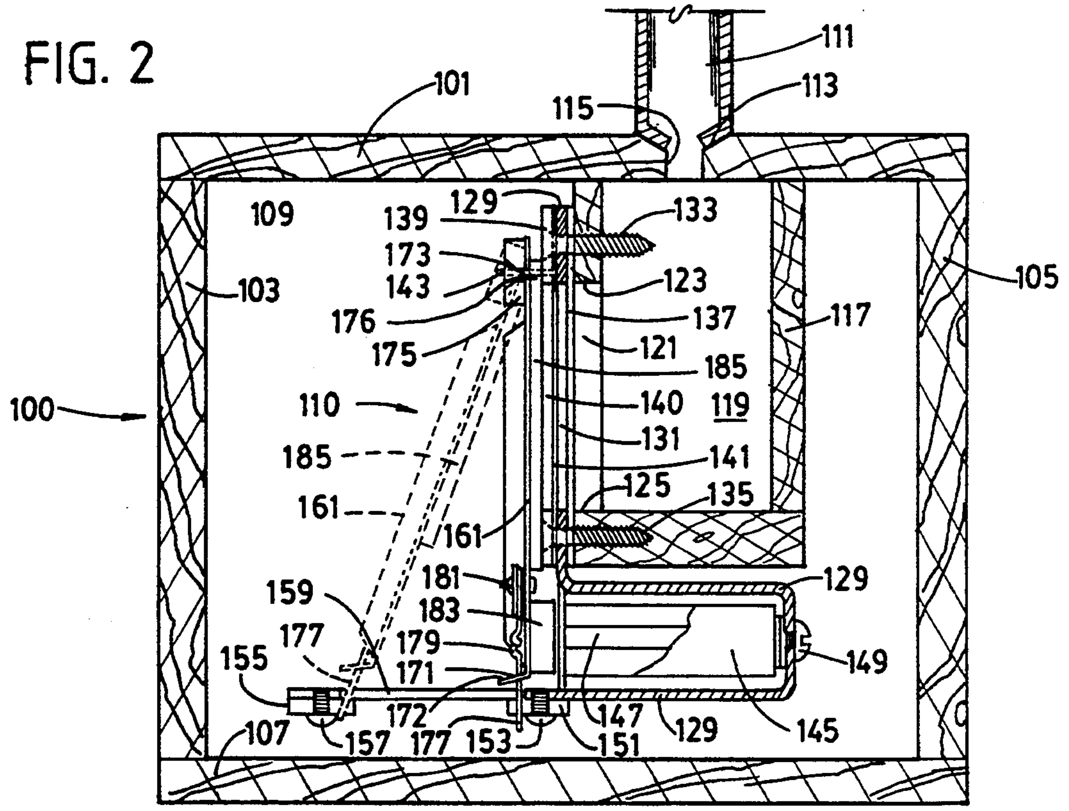
FIG. 2 is a partial cross-sectional view of a further embodiment of the valve of the present invention mounted in a wind chest connected to an organ pipe.

Referring now to the drawings, FIG. 1 is a perspective view of the valve 110 alone, while FIG. 2 shows the valve 110 mounted in a conventional pipe organ wind chest 100 having a top wall 101, side walls 103 and 105, a bottom wall 107 and two end walls (not shown), of a type known to those skilled in the art. Air under pressure is introduced into an internal cavity or chamber 109 formed by the walls of the wind chest, in a known manner. The organ pipe 111 is shown as resting or being supported in a beveled pipe hole 113, having a cylindrical opening 115. It is common practice to mount organ valves so that they are just below such cylindrical opening 115, but this causes problems because of alignment and turbulence. Therefore, when the valve 110 of the present invention is opened, as described more fully below, the pressurized air in cavity 109 will flow into a pipe through a wooden member 117, having a chamber 119, mounted below the top wall 101, causing the pipe 111 to speak. Wooden members 117, including the internal chambers 119, are preferably mounted below each of the pipe holes in the organ, and act as expansion chambers, so that the pressurized air from cavity 109 will have to first flow through these chambers 119 before entering the pipe holes. Openings of any desired shape or size may be formed in the members 117 so as to fluidly connect the cavity 109 with chamber 119. In the preferred embodiment disclosed herein the openings are shown as taking the form of elongated slots 121, having a top 123 and a bottom 125, cut into a side of the member 117. An armature assembly 161, described more fully below, of the valve 110 controls the flow of pressurized air through the opening 121 into the expansion chamber 119.

FIGS. 1–4 show that the valve 110 includes a main frame assembly 129, which can be formed in any desired shape or manner from any available material, but which, as shown in FIG. 2, is preferably fabricated from iron in a single piece having a substantially U-shape, with a further leg formed perpendicularly to one end of the top of the U, and another leg extending outwardly, in the same direction, from the end of the other leg of the U. This main frame assembly 129 has an opening or slot 131 formed in the perpendicular leg portion to substantially match the slot 121, and, as shown in FIG. 2, is mounted to the wooden member 117 in any desired manner, as by use of securing means 133 and 135, passing through the perpendicular leg portion and member 117, with the slots 121 and 131 aligned. An air tight seal is provided between the main frame 129 and wooden member 117, in any known manner, as by the use of a gasket 137, having an aligned opening, held therebetween. A further plate 139, made from any desirable material, but preferably made from iron, may be placed over the main frame assembly 129, and is held in place by any desired means, such as the securing means 133, 135. The plate 139 has an opening 140 formed therein, which includes a valve seat around the edge thereof, which opening 140 may take the form of a slot. A further sealing means, such as a gasket 141, having an opening therein, is provided between plate 139 and main frame assembly 129, to insure an air tight connection therebetween. Although the openings 140 of plate 139, and 131 in the main frame assembly 129 align in certain respects, they need not be identical. For example, the area of the opening 140 might be one-half the area of opening 131, or may be any other desired area, less than the area of opening 131. Secured to the top portion of plate 139, if used, or directly to the main frame 129, in any desired manner at substantially a right angle thereto, is a pivot means, such as a pin 143. This pivot means 143 is preferably fabricated from a non-magnetic metal so as to not effect the operation of a magnetic hinge, described below. A solenoid 145 having an iron core 147 is secured in the substantially U-shaped, bottom portion of main frame assembly 129, as by use of a securing means 149. Electrical connections to the solenoid 145 are made in a known manner, as by leads 146 and 148.

A pair of adjustment means, such as rotatable cams 151 and 155 are secured to the bottom of main frame 129, below the solenoid 145, by means of holding means 153 and 157. These adjustment means selectively control travel of a pin means 177, described below, moving in a slot 159 formed substantially along the centerline of the lower portion of the main frame 129, and extending between the holding means 151 and 155. The pin means 177 is preferably resilient, and is secured to an armature assembly 161, for control of the movement of the armature assembly, as described more fully below.

The armature assembly 161, shown in the "rest" or closed position in solid line in FIGS. 1 and 2, and in the activated or open position in broken line in FIG. 2, is preferably light in weight and consists substantially of a non-magnetic high strength channel member having a flat portion 165, side flanges 167, 169 and a bottom flange 171 supported on pivot pin 143. To keep the armature assembly weight to a minimum, it is preferably fabricated from aluminum, or a similar high strength plastic or metallic material. An elongated hole 173 is formed in the armature assembly 161, near the top thereof. This elongated hole is preferably wider at the bottom (toward the flange 171), than at the top, where it is only slightly wider than the pivot pin 143 on which it is supported. In this manner, pivot pin 143 provides vertical support to the entire armature assembly 161, in such a manner that there is substantially no resistance to movement, as explained more fully below.

Located at the top portion of the armature 161 and aligned with pivot pin 143 is a magnetic hinge means, which may take a number of forms, such as a single, rectangular shaped permanent magnet 175 having a central opening 176, as shown in FIG. 2, or as a plurality of magnets, on each side of non-magnetic materials comprising the main frame 129 and other elements of the valve. This type of magnetic hinge means is illustrated by pairs of round magnets 163, 164 shown in FIGS. 1 and 3. The magnetic hinge means could, of course, take other forms, or be located other than as illustrated, as long as it performs the same function as described herein.

The guide pin 177 is fastened to the lower portion of the armature 161, in any desired manner, such as by a securing means 181. This guide pin 177 passes through an elongated opening or slot 172 in the center of flange 171 and then into the slot 159 formed in the main frame assembly 129. The guide pin may be made of any available material, but is preferably resilient and made from a flexible material having the characteristics of a spring, such as brass, and may include a coiled portion, such as shown at 179. It should be noted that this coiled portion 179 is not required if the guide pin 177 is fabricated in such a manner that it will behave as a leaf spring when held against the adjustment means 151 and 155.

Affixed to the opposite or interior side of the flat portion 165 of the channel of armature assembly 161, in an appropriate manner, as by an adhesive, is a valve closure member 185, dimensioned so as to cooperate with and seal the valve seat around opening 140 formed in plate 139, to control the flow of air therethrough. This member 185 may take any desired shape, such as that of a rectangular pad to cooperate with the edges of an elongated slot, and may be made of any desired material for use in an organ to control air flow, such as leather, a combination of felt and leather, or the like. Also secured to the opposite or interior side of the flat portion 165 of armature assembly 161, adjacent the bottom thereof, is a permanent magnet 183, of any desired shape, such as round, having two opposed poles, faces or sides.

OPERATION OF DEVICE

The operation of the valve 110 will now be described when mounted in the wind chest 100, as shown in FIG. 2. The valve 110 is shown in the "rest" or closed position, with the armature assembly 161 and valve closure member 185 biased or pressed against and closing the valve seat around opening 140. That is, the air under pressure in cavity 109 cannot pass through opening 140 to the organ pipe 111. The armature assembly 161 and valve closure member 185 are biased or securely held against plate 139 because of three forces acting thereon. Namely, pressurized air in cavity 109 will contribute a positive force relative to air at atmospheric pressure in expansion chamber 119. In addition, magnetic hinge means 175 will be attracted to the iron plate 139, thereby holding the top portion of the armature assembly 161 securely against the plate 139 on pivot pin 143.

Figure 3:
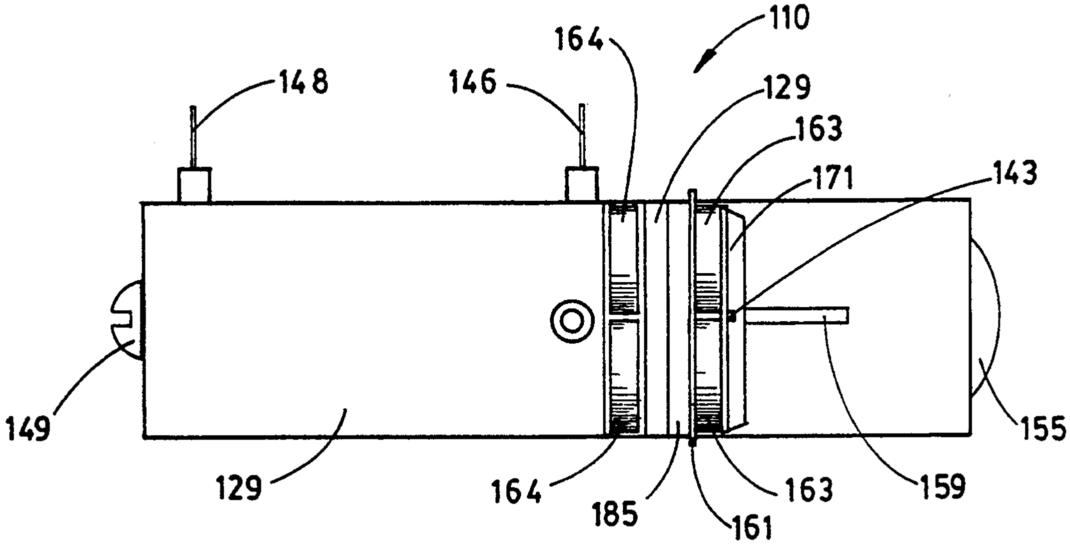
FIG. 3 is a top view of the valve of FIG. 1.

As described above, the magnetic hinge means could be changed if the plate 139 and main frame assembly 129 were made from a non-magnetic material, such as aluminum. The magnetic hinge could take the form of magnets 163, 164 as shown in FIGS. 1 and 3, or other permanent magnets could be affixed to the non-magnetic plate, or behind it in such a manner that the magnet(s) on the armature assembly 161 would be attracted to or secured to the non-magnetic plate 139. The third holding force is comprised of the mutual magnetic attraction between the iron core 147 of solenoid 145 and permanent magnet 183 secured to the lower portion of armature assembly 161, preferably on the outside surface thereof. This third holding force may be somewhat selectively offset by the action of the resilient guide pin 177 when the armature assembly is in the closed position with the guide pin 177 forced or held against the adjustment means 151.

To operate or open the valve from the closed position shown in solid line, to the open position shown in broken line, an electrical current is applied to solenoid 145, in a known manner, by leads 146, 148. This current is provided with an electrical polarity so as to produce an electro-magnet whose magnet polarity is the same as that of the pole, face or side of the permanent magnet 183 facing the solenoid. Activation of the solenoid 145, therefore, will cause the permanent magnet 183 together with the bottom portion of armature 161 to which it is attached, to be repelled or pushed away from the solenoid, until motion of the armature assembly is stopped by the guide pin 177 contacting the outer surface of adjustment means 155 at one end of slot 159. It is important to note that at the initial stage of this movement from the closed position, the guide pin 177 will aid or assist in starting the movement of the armature assembly, because the guide pin is under tension against the outer surface of the adjustment means 151, at the other end of slot 159. At the same time as the lower portion of armature assembly 161 is being pushed away from the solenoid 145, the top portion of the armature assembly is hinged or rotated on the pivot pin 143, and remains against plate 139 because of the attraction of the magnetic hinge means, such as 175. It is especially important to note that while the magnetic hinge means 175 is holding the top portion of armature assembly 161 against iron plate 139, it is having practically no impact on movement of the lower portion of the armature assembly. This is because the magnetic hinge means is centered on pivot pin 143, in a manner described more fully below. Upon energization of the solenoid 145 and movement of the lower portion of the armature 161, the valve closure member 185, secured to the inside surface of the armature assembly, and seated against the valve seat around opening 140 will also be moved, to form an opening between the valve closure member 185 and the valve seat to allow pressurized air from cavity 109 to pass through opening 140. When guide pin 177 contacts the adjustment means 155, movement of the armature assembly lower portion will be stopped, thus stopping or controlling the amount of opening of the valve closure member. The pressurized air that passes through the opening formed when the valve closure member is opened flows into the expansion chamber 119 and then into the organ pipe 111 to cause the pipe to sound. This sounding of the pipe 111 will continue until the valve is again closed.

To close the valve, the electrical current to solenoid 145 is interrupted or stopped to thereby collapse the magnetic field of the solenoid and allow the permanent magnet 183 to be again attracted to the iron core 147 of the solenoid. This attraction, in turn, causes the lower portion of the armature assembly 161 to return to its closed or rest position, described above, with the valve closure member seated against the valve seat and closing the opening 140. This return of the armature assembly to the closed position will be aided by the forces due to gravity, magnetism and the Bernouilli effect due to the flow of air through the valve 110.

Although the operation of the valve 110 might appear to be relatively simple, it should be noted that in connection with the operation of the valve in relation to pipe speech, it provides means of guiding, fine tuning and adjustment which were heretofore unavailable in pipe organ valves. That is, means are provided to adjust the rate or effective speed at which the valve 110 opens or closes. This means that the valve can be made to very accurately regulate the "on" and "off" speech of an organ pipe. And this, of course, is of the utmost importance to the organ builder and the organist. Furthermore, as discussed above known electromagnetic valves for use in pipe organs have been highly unreliable in opening. Basically their mode in opening might be termed analogous with pulling a cork out of a bottle, and when closing, such known valves might bounce, providing an additional burst of unwanted air to the pipe, or, if not accurately aligned, will not properly close the opening.

In view of the above, it is, therefore, important to consider a few of the adjustments provided by the valve of the present invention. For example, by varying the size (area) and or shape of the opening 140 in the plate 139, and the distance which the lower end of armature assembly 161 travels, the time required to move the valve to its fully open position can be adjusted. By way of illustration only and not by way of limitation, the opening 140 can be made of a predetermined size and shape when it is formed in plate 139, or an adjustable damper (not shown) can be fitted to plate 139 in such a way that it can partially close the opening 140. It has already been shown that the distance that the lower portion of armature assembly 161 travels in opening can be adjusted by rotation of adjustable cam 155. By adjusting this cam in relation to the opening 140 in plate 139, the speed at which the armature assembly moves and thus the speed the valve moves to its fully open position can be adjusted. Assume, for example, that when the lower portion of the armature assembly 161 has moved 12 mm the valve will be fully opened relative to the opening 140 in plate 139. This will produce one rate of valve opening. However, if the opening 140 is enlarged so that the valve will be fully opened when the armature assembly lower portion travels but 6 mm (by adjusting the cam 155 to limit the travel of the guide pin 177 and thus the lower portion of the armature), the time required for the valve to fully open will be much less. In all cases, because of the fact that the armature assembly is effectively "hinged" at the top, the opening of the valve will not be as abrupt as in the case of known electro-magnetic lever magnets.

From the above, it should be evident that a great range of adjustment is available with the valve of the present invention for the "on" cycle of pipe speech. Attention should now be given to the resources available in the present invention for regulation of the "off" cycle of pipe speech. Assume a condition where adjustable cam 151 is adjusted so that the valve closure member will fully close the opening 140 before guide pin 177 can contact the cam 151. The following will be the result: when electrical current to solenoid 145 is interrupted, the valve will be closed by the three forces discussed above acting on the armature assembly. Because of the interaction of permanent magnet 183 and iron core 147 of solenoid 145, the closing action will be highly damped and positive. However, in some cases it might be desirable to accelerate the closing. This is easily done by placing a second permanent magnet (not shown) just below permanent magnet 175 on the armature assembly 161. This second permanent magnet will be attracted to iron plate 139 and add additional force to the closing of the valve.

As discussed above, the adjustment means 151 acting on guide pin 177 can assist in opening the valve. It is likewise evident that if adjustment means 151, such as the cam, is so adjusted in the closing cycle of the valve that guide pin 177 will contact or strike it before the valve is fully closed, that the final portion of the closing cycle will be slowed. These and other features of the invention make it highly desirable for use to obtain the optimum pipe speech from the pipes which it controls. Other variations might include having the armature assemblies of different lengths, shapes, and similar changes.

Figure 4:
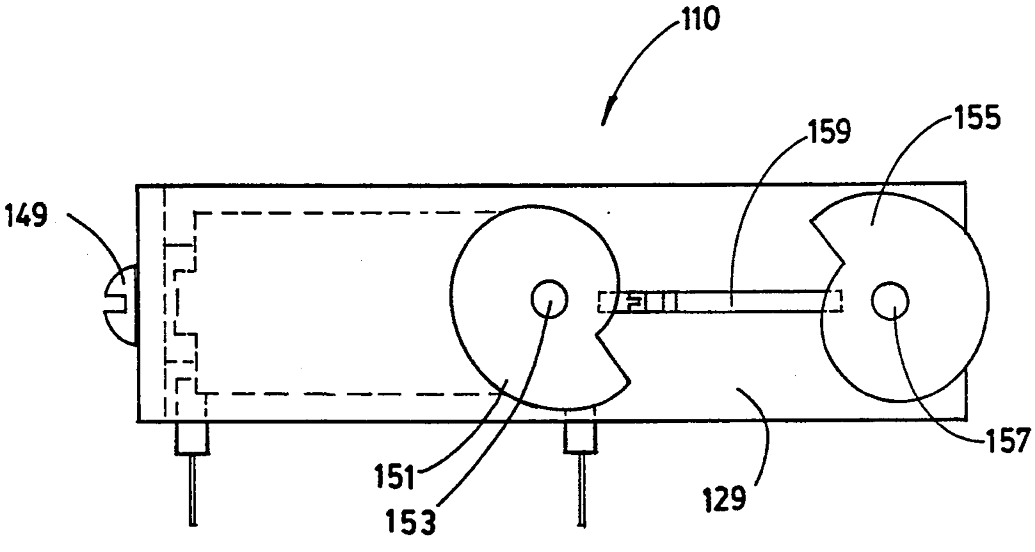
FIG. 4 is a bottom view of the valve of FIG. 1.
Figure 5:
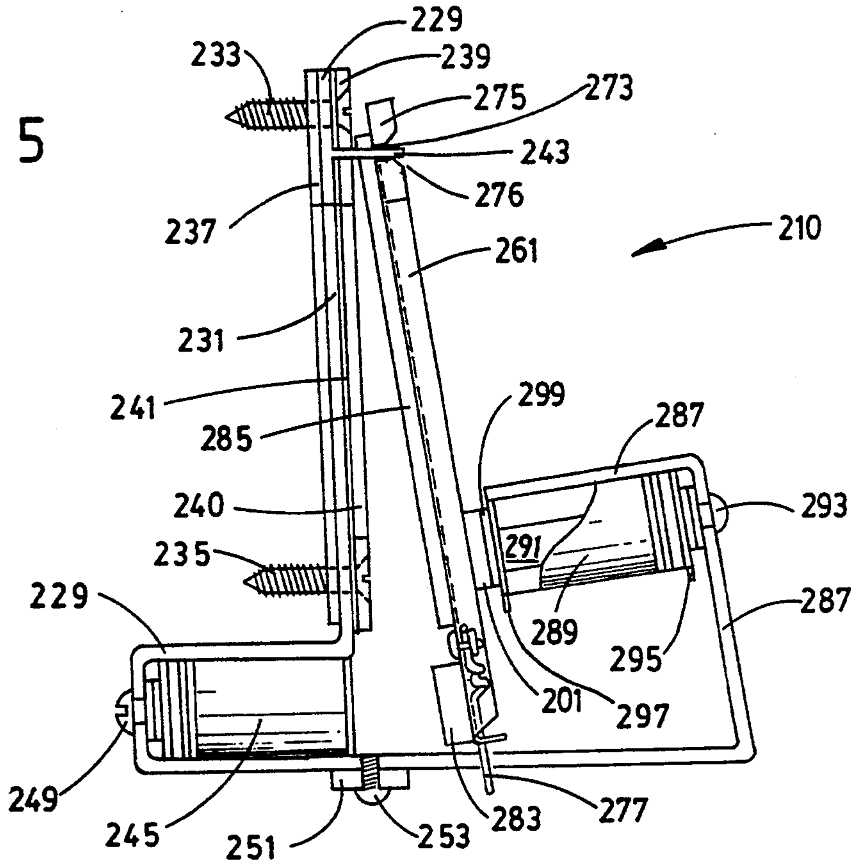
FIG. 5 is a side view of a still further embodiment of the valve of the present invention.

Another embodiment of the valve of the present invention is shown at 210 in FIG. 5 in the open position. This embodiment of valve 210 has all of the elements described above in connection with FIGS. 1–4, except for the lack of a second adjustment means, such as that shown at 155. However, to distinguish these embodiments, all elements in FIG. 5 are indicated by the series of numerals 200, as opposed to the 100 series used in FIGS. 1–4. A substantially U-shaped extension 287 has been added to the outwardly extending leg or portion of one end of the U-shaped portion of a main frame assembly 229. A second solenoid 289, having an iron core 291, and electrical leads 295, 297, is mounted in the frame extension 287, as by a securing means 293. A further plate 201 made from a magnetic material, such as iron is mounted to the armature assembly 261 on the exterior surface thereof, away from the valve closure member 285. This further plate 201 includes a pliant pad 299 secured thereto. In the open position of the valve 210 shown in FIG. 5, electrical current is provided to both solenoids 245 and 289. In transition from the closed state to the open state shown, the bottom portion of armature assembly 261 is repelled from the solenoid 245 because of the reaction between solenoid 245 and permanent magnet 283, and at the same time is attracted to solenoid 289 because of the reaction between iron plate 201 and solenoid 289. When the pliant pad 299 secured to plate 201 reaches solenoid 289 it acts as a cushion and is held there until current is interrupted to both solenoids. When such interruption of current occurs, the armature assembly 261 will be returned to the rest or closed position, as shown in FIGS. 1–4, by all of the forces discussed previously in connection with FIGS. 1 and 2.

Figure 6:
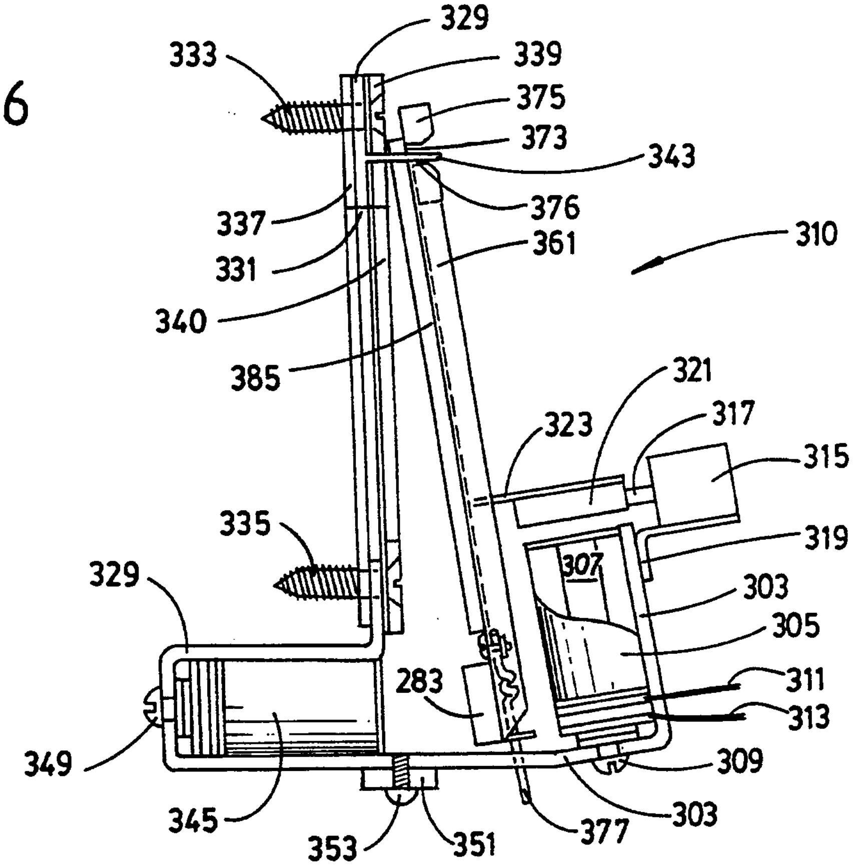
FIG. 6 is a side view of yet another embodiment of the valve of the present invention.

FIG. 6 shows still another embodiment of the valve of the present invention at 310, also in the open position. This embodiment of valve 310 has all of the elements described above in connection with FIGS. 1–4, except for the lack of a second adjustment means, such as that shown at 155. However, to distinguish this embodiment from other embodiments described herein, all elements in FIG. 6 are indicated by the series of numerals 300, as opposed to the 100 series used in FIGS. 1–4, and the 200 series used in FIG. 5. An L-shaped extension 303 has been added to an extending arm of a substantially U-shaped portion of a main frame assembly 329. A second solenoid 305, having an iron core 307, and electrical leads 311, 313 is mounted in the frame extension 303, as by a securing means 309. A further bracket 319 is mounted to the L-shaped extension 303 and includes a cushioning or damping means 315, such as a dashpot having a plunger 317, secured thereto. A still further bracket 323, having a permanent magnet 321 secured thereto, is mounted to the armature assembly 361, in any desired manner. In the open position of the valve 310 shown in FIG. 6, electrical current is provided to both solenoids 345 and 305. Valve 310 will be held in the open position shown in FIG. 6 as long as current is not interrupted, because of the repelling action between permanent magnet 383 and solenoid 345, as well as the attraction of permanent magnet 321 to solenoid 305. In transition from the closed state to the open state shown, the bottom portion of armature assembly 361 is repelled from the solenoid 345 because of the reaction between solenoid 345 and permanent magnet 383, and the attraction of permanent magnet 321 to the magnetic field of solenoid 305. In this configuration, permanent magnet 321, because of acceleration of mass when the valve is opening, is prone to overshoot the open position shown in FIG. 6. This problem is minimal because the plunger 317 of the dashpot 315 will contact permanent magnet 321 to arrest its excess motion. When the current is interrupted to both solenoids 345 and 305, the armature assembly 361 will be returned to the rest or closed position as shown in FIGS. 1–4. It should be noted that this embodiment is best suited to very large valves to obtain the best efficiency. This is because of the attraction of permanent magnet 321 to the iron core 307 of solenoid 305, even after the current is interrupted. A large valve will produce a Bernouilli effect that will supply a force sufficient to draw armature assembly 361 toward the closed position. Of course, a return spring would have the same effect, but at a sacrifice in efficiency.

Figure 7:
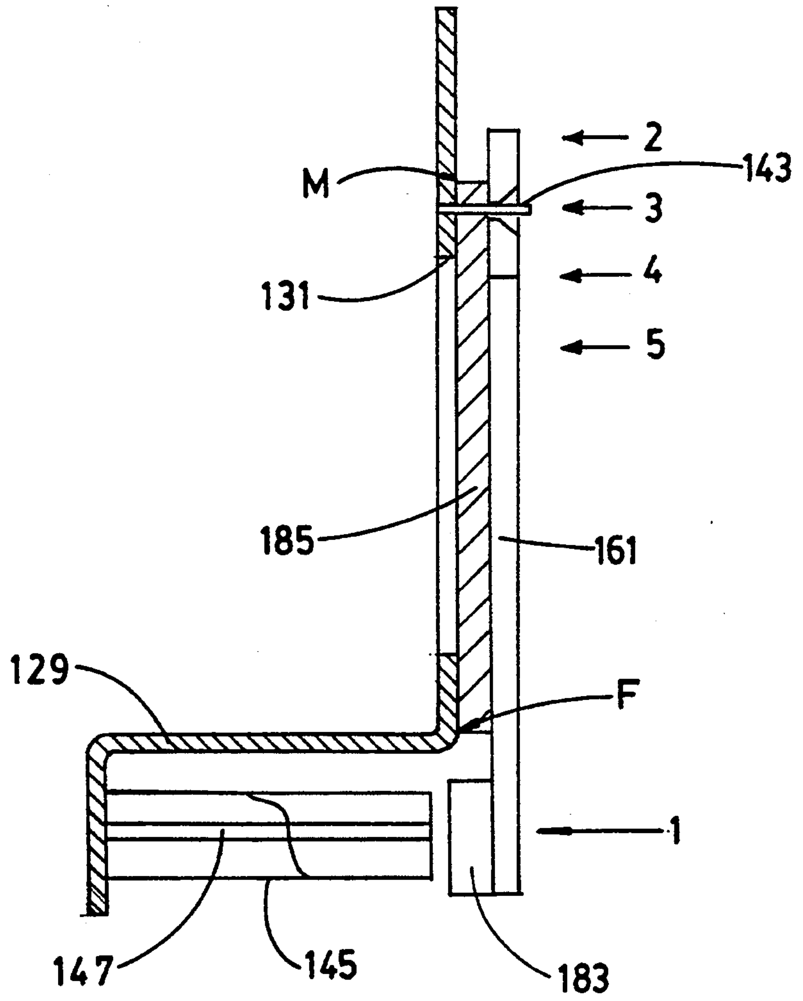
FIG. 7 is schematic view showing how to best calculate/locate the position for the magnetic hinge of the valve of the present invention.

Turning now to FIG. 7, there shown is a preferred means or method for calculating or determining the best locations or positions for a magnet or magnetic hinge means on the armature assembly 161 (also 261 and 361). In this connection it should be noted that an understanding of the operation of the magnets located on the armature assembly is essential to understanding the operation of the embodiments of the valve of the present invention. The centerlines of magnets that may be located on the armature are indicated by the arrows 1–5. Arrow number 1, located at the bottom portion of the armature assembly 161 is the preferred location of the permanent magnet 183 (also 283 and 383) which operates in conjunction with the solenoid 145 (also 245 and 345). In a power-off position magnet 183 is attracted to the iron core 147 of solenoid 145. To understand this process, the armature 161, having the resilient valve closure member 185 is considered to be a lever having a fulcrum at point F. The lever action of the armature 161 at F will try to pull the top of the armature assembly 161 away for the main frame 129 unless this force is countered by forces at the top of the armature assembly forcing or pulling the top of the armature into the main frame. Since the distance between point F and the center of a magnet at the top of the armature is fixed, it is easy to determine the force required at the locations indicated by arrows 2–5, to overcome the force at F and hold the top of the armature to the main frame 129. A magnet located at arrow 2 would give the greatest mechanical advantage, but would not be the best location. Although a magnet at the location indicated by arrow 2 would hold the top of the armature against the frame, in a condition where the valve is open, it would tend to slow the closing of the valve because a second fulcrum would be created at the point indicated by the arrow M. On the other hand, a magnet located at the position indicated by arrow 3, would be in a relatively balanced condition. This location 3, then is the preferred position. Locations indicated by arrows 4 and 5 will assist in the valve closing, but require more powerful magnets than required at location 3.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An electrically operated valve assembly adapted to be mounted in a pipe organ wind chest in a manner so that said valve assembly controls air under pressure from the wind chest to at least one organ pipe, including in combination:

- a main frame assembly having an air passage opening passing therethrough;
- an armature assembly having a bottom portion, a top portion, a front surface and a rear surface, suspended in said main frame assembly at the top portion of said armature assembly, by a pivot pin captured in said main frame assembly, and movable between a closed position and an open position;
- a valve closure means secured to one surface of said armature assembly and cooperating with said air passage opening in said main frame assembly to allow air to pass therethrough in the open position of said armature assembly and to stop flow of air therethrough in the closed position;
- said armature assembly being held in magnetic fields at both the top and bottom portions thereof; and
- said magnetic fields being produced by a permanent magnet secured to one of the surfaces of said armature assembly reacting with an iron core of a solenoid mounted to said main frame assembly, adjacent said permanent magnet, and a further permanent magnet means secured to at least one surface of said armature assembly adjacent said pivot pin attracted to a surface.

2. The electrically operated valve assembly of claim 1 wherein said further permanent magnet means secured to said at least one surface of said armature assembly is comprised of a single, substantially rectangular magnet having an opening formed therein and secured to said front surface of said armature assembly over said pivot pin, to form a magnetic hinge for said top portion of said armature assembly.

3. The electrically operated valve assembly of claim 2 wherein said permanent magnet secured to said one of the surfaces of said armature assembly is secured to the same surface of said armature as said valve closure means, and said solenoid is mounted within said main frame assembly on said same surface as said permanent magnet and said valve closure member.

4. The electrically operated valve assembly of claim 1, further including a guide pin secured to the bottom portion of said armature assembly, said guide pin cooperating with a slot formed in said main frame assembly to limit movement of said bottom portion of said armature assembly and to guide the movement of said armature assembly between the closed and open positions, to insure close alignment and to eliminate side play thereof.

5. The electrically operated valve assembly of claim 4 wherein said slot formed in said main frame assembly has at least one adjustable stop means mounted to said main frame assembly and cooperating with said guide pin to selectively control movement of said guide pin between the closed and open positions of said armature assembly.

6. The electrically operated valve assembly of claim 5 wherein said guide pin is formed from a resilient material and said slot formed in said main frame assembly has two ends, with adjustable stop means mounted to said main frame assembly on said two ends and cooperating with the resilient guide pin, to both selectively control movement of said bottom portion of said armature assembly between the open and closed positions, and to assist in the movement of said bottom portion of said armature assembly.

7. The electrically operated valve assembly of claim 1 wherein said further permanent magnet means secured to said at least one surface of said armature is comprised of a plurality of magnets cooperating with both the front and rear surfaces of said armature assembly to hold said armature assembly top portion to said main frame assembly and to form a magnetic hinge for said top portion of said armature assembly.

8. The electrically operated valve assembly of claim 1 wherein said permanent magnet secured to said one of the surfaces of said armature assembly is secured to the same surface of said armature as said valve closure means, and said solenoid is mounted within said main frame assembly on said same surface as said permanent magnet and said valve closure member.

9. The electrically operated valve assembly of claim 8, further including a guide pin secured to the bottom portion of said armature assembly, said guide pin cooperating with a slot formed in said main frame assembly to limit movement of said bottom portion of said armature assembly.

10. The electrically operated valve assembly of claim 9 wherein said slot formed in said main frame assembly has at least one adjustable stop means mounted to said frame and cooperating with said guide pin to selectively control movement of said guide pin and to guide the movement of said armature assembly between the closed and open positions of said armature assembly to insure close alignment and to eliminate side play thereof.

11. The electrically operated valve assembly of claim 10 wherein said guide pin is formed from a resilient material and said slot formed in said main frame assembly has two ends, with adjustable stop means mounted to said main frame assembly on said two ends and cooperating with the resilient guide pin to both selectively control movement of said bottom portion of said armature assembly between the open and closed positions, and to assist in the movement of said bottom portion of said armature assembly.

12. The electrically operated valve assembly of claim 1, further including a second solenoid having an iron core mounted to said main frame assembly, said second solenoid cooperating with a still further permanent magnet means secured to one of the surfaces of said armature assembly so as to both aid in moving said armature assembly to the open position and holding said armature assembly in the open position.

13. The electrically operated valve assembly of claim 12, further including a bracket secured to and forming part of said main frame assembly and supporting said second solenoid therein in such a manner that said still further permanent magnet secured to said armature assembly is axially aligned with said iron core of said second solenoid.

14. The electrically operated valve assembly of claim 12, further including first and second brackets, with said first bracket secured to and forming part of said main frame assembly and supporting said second solenoid therein, and said second bracket being secured to said armature assembly with said still further permanent magnet secured thereto so as to be transversely mounted with respect to said iron core of said second solenoid.

15. An electrically operated valve assembly mounted in a pipe organ wind chest to control air under pressure passing from said wind chest to at least one organ pipe, including in combination:

- a main frame assembly having a valve seat surrounding an air passage opening passing through said main frame assembly and fluidly connected to said at least one organ pipe, and a solenoid mounted within said main frame assembly;
- an armature assembly having a bottom portion, a top portion, a front surface and a rear surface, suspended by a pivot pin captured in said main frame assembly at the top portion of said armature assembly, said armature assembly movable between a closed position and an open position;
- a valve closure means secured to said rear surface of said armature assembly and cooperating with said valve seat to normally stop the flow of air through said air passage opening in said main frame assembly to said at least one pipe organ, and to selectively control the flow of air therethrough when said armature assembly and said valve closure member are moved from the closed position toward the open position of said armature assembly;
- a permanent magnet secured to said rear surface of said armature assembly at the bottom portion thereof;
- said armature assembly having magnetic fields formed at both the top and bottom portions thereof; and
- said magnetic fields being produced by said permanent magnet secured to said bottom surface of said armature assembly reacting with an iron core of said solenoid mounted within said main frame assembly adjacent to and aligned with said permanent magnet, and a single, substantially rectangular magnet having an opening formed therein secured to said front surface of said armature assembly, over said pivot pin and cooperating with another surface to form a magnetic hinge for said top portion of said armature assembly.

16. The electrically operated valve assembly of claim 15, further including a guide pin secured to the bottom portion of said armature assembly below said permanent magnet, said guide pin cooperating with a slot formed in said main frame assembly to limit movement of said bottom portion of said armature assembly and to guide the movement of said armature assembly between the closed and open positions to insure close alignment and to eliminate side play thereof.

17. The electrically operated valve assembly of claim 16 wherein said slot formed in said main frame assembly has at least one adjustable stop means mounted to said main frame assembly and cooperating with said guide pin to selectively control movement of said guide pin between the closed and open positions of said armature assembly.

18. The electrically operated valve assembly of claim 17, further including a second solenoid having an iron core mounted to a bracket fixed to said main frame assembly, said second solenoid cooperating with a still further permanent magnet means secured to one of the surfaces of said armature assembly so as to both aid in moving said armature assembly to the open position and holding said armature assembly in the open position.

19. An electrically operated valve assembly, including in combination:

- a main frame assembly having a valve seat surrounding an opening passing entirely through said main frame assembly;
- a first solenoid having an iron core mounted within an area formed in said main frame assembly;
- an armature assembly having a bottom portion, a top portion, a front surface and a rear surface, suspended by a pivot pin secured to said main frame assembly at the top portion of said armature assembly to allow said armature assembly to move between a closed position and an open position;
- a valve closure means secured to said rear surface of said armature assembly and cooperating with said valve seat to normally close said opening in said main frame assembly;
- a first permanent magnet having first and second faces secured to said rear surface of said armature assembly at the bottom portion thereof;
- a first magnetic field at the bottom of said armature assembly, for closing and opening said armature assembly, produced by one of the faces of said first permanent magnet assembly reacting with said iron core of said first solenoid mounted within said area in said main frame assembly adjacent to and aligned with said first permanent magnet;
- means for applying an electrical current to said first solenoid to repel said one of the faces of said permanent magnet to move said bottom portion of said armature assembly from said closed position to open said valve seat; and
- a second magnetic field at the top portion of said armature assembly produced by a second permanent magnet means secured to at least one surface of said armature assembly adjacent said pivot pin cooperating with a further surface, to form a magnetic hinge for said top portion of said armature assembly when said bottom portion of said armature assembly moves between said closed and open positions.

20. The electrically operated valve assembly of claim 19, further including a resilient guide pin secured to the bottom portion of said armature assembly below said permanent magnet, said resilient guide pin cooperating with a slot formed in said main frame assembly having at least one adjustable stop means mounted to said main frame assembly and cooperating with said resilient guide pin to selectively control movement of said resilient guide pin between the closed and open positions of said armature assembly to limit movement of said bottom portion of said armature assembly and to guide the movement of said armature assembly between the closed and open positions to insure close alignment and to eliminate side play thereof; and a second solenoid having an iron core mounted to a bracket fixed to and extending said main frame assembly away from said first solenoid, said second solenoid cooperating with a third permanent magnet means secured to one of the surfaces of said armature assembly so as to both aid in moving said armature assembly to the open position and holding said armature in the open position.

* * * * *